United States Patent [19]

Kawamura

[11] Patent Number: 4,782,393
[45] Date of Patent: Nov. 1, 1988

[54] TELEVISION CAMERA SYSTEM WITH A PROTECTION FUNCTION FOR A MISCONNECTION

[75] Inventor: Kazuo Kawamura, Yokohama, Japan
[73] Assignee: Kabushiki Kaisha Toshiba, Kawasaki, Japan
[21] Appl. No.: 16,363
[22] Filed: Feb. 19, 1987
[30] Foreign Application Priority Data Mar. 11, 1986 [JP] Japan ................................. 61-53102

[51] Int. Cl.$^4$ ............................................... H04N 5/30
[52] U.S. Cl. .................................... 358/209; 358/210; 340/538; 307/140
[58] Field of Search ........................ 358/185, 209, 210; 307/125, 129, 130, 140, 40, 147; 340/531-534, 538

[56] References Cited

U.S. PATENT DOCUMENTS 3,215,774 11/1965 Ikegami ................................. 358/210
3,467,835 9/1969 DeCola ................................. 307/140
4,148,069 4/1979 Smiley et al. ........................ 358/185

Primary Examiner—L. T. Hix
Assistant Examiner—David M. Gray
Attorney, Agent, or Firm—Oblon, Fisher, Spivak, McClelland & Maier

[57] ABSTRACT

A camera control unit includes a control section for generating various control outputs, a power generator for generating power, and an identifying signal generator for generating an identifying signal. One end of a camera cable is connected to the camera control unit to transmit the control outputs, the power, and the identifying signal. A camera head is connected to the other end of the camera cable. The camera head includes a camera section for receiving the control outputs and sending a video output, an identifying signal detector for receiving the identifying signal and identifying the appropriate type of camera head, a power switch circuit for receiving the power and switching the power on the basis of an identification result of the identifying signal detector, and a power supply circuit for supplying the DC power from the power switch circuit to the camera section.

11 Claims, 3 Drawing Sheets

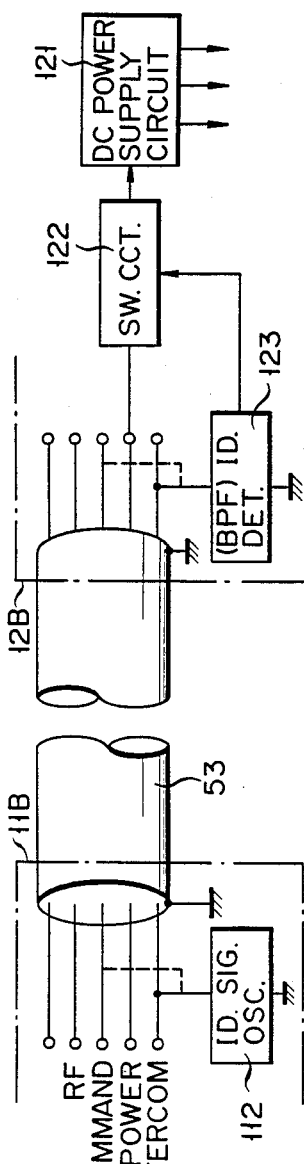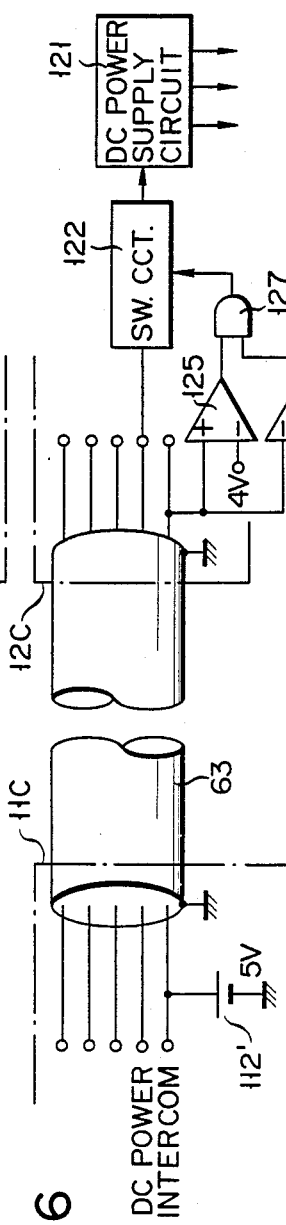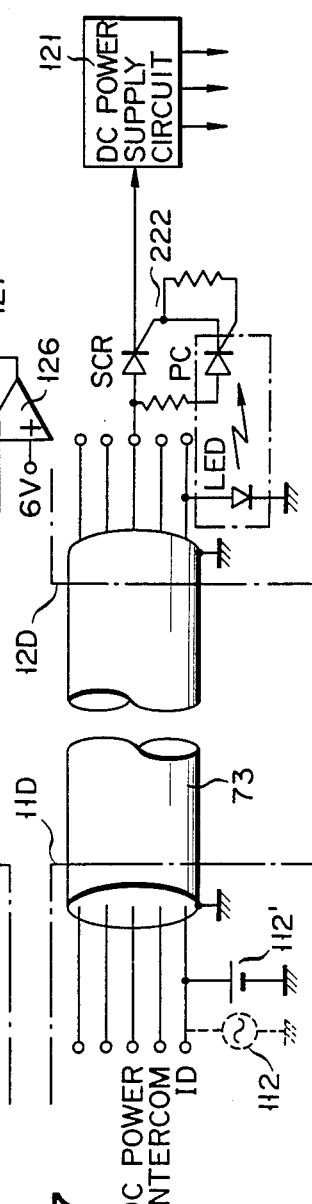

TELEVISION CAMERA SYSTEM WITH A PROTECTION FUNCTION FOR A MISCONNECTION

BACKGROUND OF THE INVENTION

This invention relates to a television camera system with a protection function for a misconnection and, more particularly, to a television camera system for causing a camera control unit to supply power to a television camera head through a camera cable.

In a conventional television camera system wherein a camera control unit (to be referred to as a CCU hereinafter) and a television camera head (to be referred to as a HEAD hereinafter) are separated, the CCU is connected to the HEAD by a camera cable. Although various types of television cameras are used in practice, the types of camera cable connectors are limited. For example, if existing embedded cables in studios and stadiums as photographing sites are to be connected to conversion cables, and the CCU and the HEAD are connected through these cables, different types of CCUs and HEADs may often be connected. In this case, if power is sent from the CCU side to the HEAD, the HEAD may be damaged.

SUMMARY OF THE INVENTION

It is, therefore, an object of the present invention to provide a new and improved television camera system with a protection function for a misconnection, in which, if the wrong type of power is sent from a CCU to a HEAD by a misconnection of a camera cable, the HEAD cuts off the power of the wrong CCU in order to prevent the damage to the camera by the power, thereby protecting the HEAD from the misconnection.

According to the present invention, there is provided a television camera system with a protection function for a misconnection, the system comprising:

a camera control unit including power generating means for generating power, and identifying signal generating means for generating an identifying signal;

a camera cable, one end of which is connected to the camera control unit, the camera cable being adapted to transmit the power and the identifying signal; and a camera head connected to the other end of the camera cable, the camera head being provided with identifying signal detecting means for receiving the identifying signal and identifying the appropriate type of camera head, power switching means for receiving the power and switching the power on the basis of a discrimination result of the identifying signal detecting means, and power supply circuit means for utilizing the power from the power switching means.

BRIEF DESCRIPTION OF THE DRAWINGS

These and other objects and features of the present invention can be understood through the following embodiments by reference to the accompanying drawings, in which:

FIGS. 5 to 7 are detailed diagrams showing the main parts of television camera systems using multicore cables according to other embodiments of the present invention.

DETAILED DESCRIPTION OF THE PREFERRED EMBODIMENTS

A few preferred embodiments of the present invention will be described with reference to the accompanying drawings.

Figure 1:
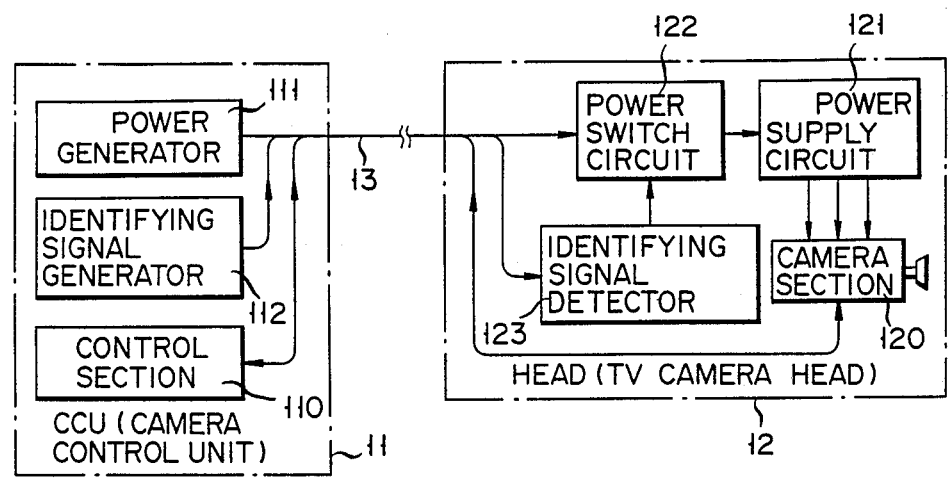
FIG. 1 is a block diagram showing a basic arrangement of a television camera system according to an embodiment of the present invention.

FIG. 1 shows the basic arrangement of a television camera system according to an embodiment of the present invention. Reference numeral 11 denotes a CCU (Camera Control Unit); 12, a HEAD (television camera HEAD); and 13, a camera cable. CCU 11 includes a power generator 111 for generating power, for example, a DC voltage of 200V, in addition to control section 110. Various control outputs and the power are sent from CCU 11 to HEAD 12 through camera cable 13. CCU 11 also includes identifying signal generator 112 for generating an identifying signal (to be described later). The identifying signal generated by generator 112 is sent together with the control outputs and the power to HEAD 12 through cable 13. In addition to camera section 120, HEAD 12 includes power supply circuit 121 for receiving the power from CCU 11 and converting it into predetermined power required for driving camera section 120, and identifying signal detector 123 for detecting the identifying signal from CCU 11 to discriminate whether HEAD 12 is connected to an appropriate type of CCU and for causing power switch ciccuit 122 to operate on the basis of the discrimination result. A video output from camera section 120 in HEAD 12 is sent to control section 110 in CCU 11 through cable 13.

In the television camera system described above, identifying signal generator 112 generates the identifying signal for identifying the type of head to be connected to CCU 11, and the identifying signal is sent to HEAD 12 through camera cable 13. Identifying signal detector 123 is arranged in HEAD 12 to detect the identifying signal sent from CCU 11. If the identifying signal represents that the type of HEAD to be connected is appropriate, switch circuit 122 is turned on. Otherwise, switch circuit 122 is turned off. In other words, the power from CCU 11 is sent to power supply circuit 121 in HEAD 12 only when the type of HEAD 12 is appropriately specified. If HEAD 12 is connected to a wrong type of CCU, the power is not supplied to power supply circuit 121. As a result, HEAD 12 is not damaged.

The components of the television camera system described above will be described in detail.

Identifying signal generator 112 in CCU 11 comprises an oscillator for generating an AC signal having frequency f [Hz] corresponding to the type of HEAD to be connected. An oscillator output serves as the identifying signal. Identifying signal detector 123 in HEAD 12 to be specified comprises a detector including a bandpass filter (BPF) for extracting only the AC signal having frequency f [Hz]. The AC signal having frequency f [Hz] is used as the identifying signal and is sent from CCU 11 to HEAD 12. If this AC signal is detected by detector 123 including the BPF, the system identifies that CCU 11 is connected to the appropriate type of HEAD 12. Therefore, power switch circuit 122 can be operated in response to an output from identifying signal detector 123.

Figure 2:
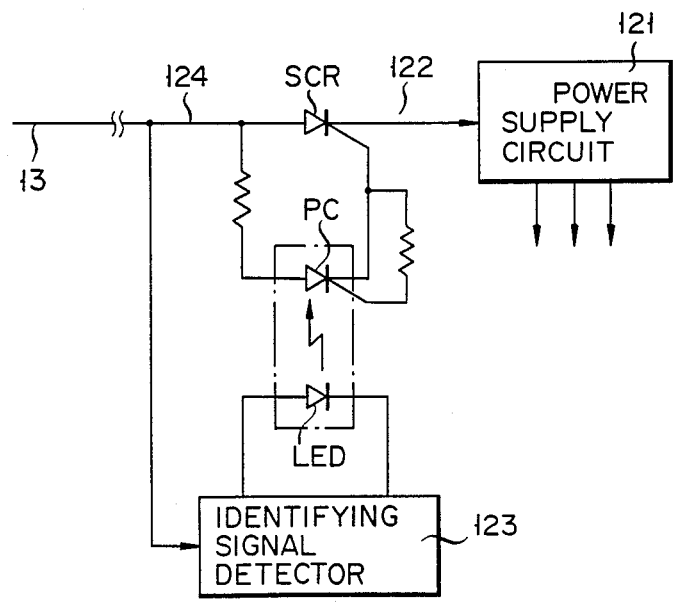
FIG. 2 is a detailed diagram showing the main part of the system shown in FIG. 1.

Power switch circuit 122 is arranged as shown in FIG. 2. In power switch circuit 122, thyristor SCR is connected to power line 124 connected to camera cable 13, and thyristor SCR is controlled by photocoupler (thyristor) PC. In this case, light-emitting diode LED is used for causing identifying signal detector 123 to detect the identifying signal. If detector 123 detects the identifying signal, diode LED is turned on. Thyristor SCR in power switch circuit 122 is turned on through photocoupler (thyristor) PC, and therefore, the DC power can be supplied to power supply circuit 121.

If the identifying signal is not detected, light-emitting diode LED is not turned on. Thyristor SCR is kept off to prevent the supply of DC power to power supply circuit 121.

Figure 3:
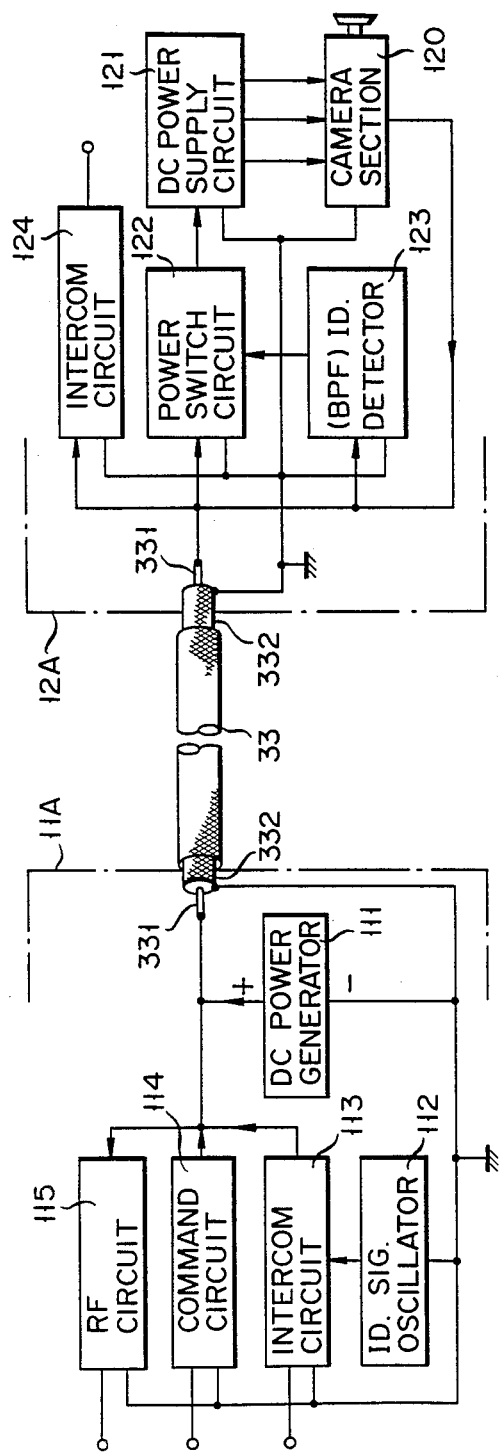
FIG. 3 is a block diagram showing the main part of a television camera system using a double coaxial cable according to another embodiment of the present invention.
Figure 4:
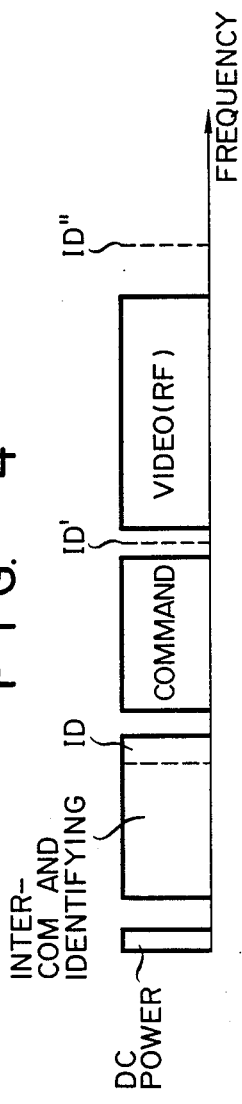
FIG. 4 is a chart showing the frequency ranges of a transmission signal used in the embodiment of FIG. 3.

FIG. 3 shows an application wherein double coaxial cable (triaxial cable) 33 is used as the camera cable. In this case, in CCU 11A, DC power generator 111′, identifying signal oscillator 112, intercom circuit 113, command circuit 114, and RF circuit 115 are connected between internal shield 332 and core wire 331 of double coaxial cable 33 to transmit an intercom signal, an identifying signal, a command signal, a video signal, and DC power, with a frequency arrangement as shown in FIG. 4. In this arrangement, in order to send identifying signal in the intercom band, multiplexing by modulation is employed, wherein an identifying signal having a frequency higher than an audible frequency, e.g., 80 kHz, generated by identifying signal oscillator 112, is superposed on the intercom band. The identifying signal may have a band outside the band of a command or video signal, as indicated by ID′ or ID″. In HEAD 12A, power switch circuit 122 having the same arrangement as in FIG. 1, identifying signal detector 123, DC power supply circuit 121, and camera section 120 are connected between the internal shield and core wire 331 of double coaxial cable 33. Intercom circuit 124 is connected to core wire 331. The intercom is herein defined as a communication telephone line between the CCU and the HEAD.

FIGS. 5, 6, and 7 show the main parts each using multicore cable 53, 63, or 73 as the camera cable.

Referring to FIG. 5 or 6, an AC signal from oscillator 112 having the same arrangement as in FIG. 3, or a DC signal (5V) from DC power supply 112′ is superposed as the identifying signal on the intercom circuit in CCU 11B or 11C. The arrangement of HEAD 12B in FIG. 5 can be the same as that in FIG. 3. HEAD 12C in FIG. 6 includes voltage detector 125 of 4V or more, voltage detector 126 of 6V or less, and AND gate 127 for calculating an AND product of the outputs from detectors 125 and 126. AND gate 127 serves as an identifying signal detector.

FIG. 7 shows an application for transmitting a DC or AC identifying signal by using an identifying signal line. Light-emitting diode LED is used as an identifying detector in HEAD 12D and is directly driven by the DC identifying signal. Power switch circuit 122 having the same arrangement as in FIG. 2 is arranged in HEAD 12D.

As is apparent from the detailed applications in FIG. 3 and FIGS. 5 to 7, the same protection function for a misconnection of the camera cable can be provided in the same manner as in the basic arrangement of FIG. 1.

In a television camera system having the above arrangement, even if the CCU is connected to the wrong type of HEAD, the type of HEAD can be identified. Therefore, the power from the CCU can be cut off in the HEAD, thereby preventing the damage to the HEAD by the misconnection.

According to the present invention as described above, there is provided a television camera system wherein, even if the power is sent from the wrong type of CCU to the HEAD, the HEAD can be protected from the misconnection.

What is claimed is:

1. A television camera system with a protection function for a misconnection, said system comprising:
a camera control unit including power generating means for generating power, and identifying signal generating means for generating an identifying signal;
a camera cable, one end of which is connected to said camera control unit, said camera cable being adapted to transmit the power and the identifying signal; and
a camera head connected to the other end of said camera cable, said camera head being provided with identifying signal detecting means for receiving the identifying signal and identifying the appropriate type of camera head, power switching means for receiving the power and switching the power on the basis of a discrimination result of said identifying signal detecting means, and power supplied supply circuit means for utilizing the power from said power switching means.

2. A system according to claim 1, wherein the identifying signal comprises an AC signal having a predetermined frequency.

3. A system according to claim 1, wherein said power switching means comprises a switching element and a photocoupling element for switching said switching element in response to an output from said identifying signal detecting means.

4. A system according to claim 2, wherein the AC signal having the predetermined frequency and serving as the identifying signal is multiplexed with other signals sent through said camera cable.

5. A system according to claim 1, wherein said camera control unit and said camera head comprise intercom circuits, respectively.

6. A system according to claim 5, wherein the identifying signal is multiplexed within a band of said intercom circuit.

7. A system according to claim 1, wherein said camera cable comprises a double coaxial cable.

8. A system according to claim 1, wherein said camera cable comprises a multicore cable.

9. A system according to claim 2, wherein said identifying signal detecting means includes a band-pass filter.

10. A system according to claim 8, wherein the identifying signal comprises a DC signal having a predetermined voltage.

11. A system according to claim 8, wherein the identifying signal is sent through an identifying signal line of a multicore cable serving as said camera cable.

* * * * *